United States Patent [19]

Julian Lecha

[11] Patent Number: 4,752,892

[45] Date of Patent: Jun. 21, 1988

[54] MEASURING ELEMENTS OF CLOSED CIRCUIT SYSTEMS FOR CONTROLLING-CORRECTING THE PRINT IN OFFSET PRINTING MACHINES

[75] Inventor: Manuel Julian Lecha, Barcelona, Spain

[73] Assignee: Salvat Editores, S.A., Barcelona, Spain

[21] Appl. No.: 315,647

[22] Filed: Oct. 27, 1981

[30] Foreign Application Priority Data

Jul. 10, 1981 [DE] Fed. Rep. of Germany ....... 3127381

[51] Int. Cl.⁴ .................... G01J 3/46; G06F 15/40
[52] U.S. Cl. ................................. 364/518; 101/134; 101/136; 356/425; 364/523; 364/526; 364/552; 364/558
[58] Field of Search ............... 364/518, 523, 525, 526, 364/550, 551, 552, 558; 101/130, 134, 177, 136, 452; 356/418, 425, 448 X

[56] References Cited

U.S. PATENT DOCUMENTS

| | | | |
|---|---|---|---|
| 3,756,725 | 9/1973 | Manring | 356/425 |
| 4,090,243 | 5/1978 | Kotera et al. | 364/526 |
| 4,402,611 | 9/1983 | Yuasa | 364/526 |

OTHER PUBLICATIONS

Darby; Donald A. et al., 'Quality Control of Textile Color by Mini/Micro Computer', Proceedings of Southeastcon, 1979.

*Primary Examiner*—Parshotam S. Lall
*Assistant Examiner*—Kevin J. Teska
*Attorney, Agent, or Firm*—Wenderoth, Lind & Ponack

[57] ABSTRACT

An improvement in the measuring elements of closed circuit systems for controlling-correcting printing in offset printing machines is provided. The values of measurements are amplified, analogically commutated, converted from analog to digital form, and then microprocessed so as to be compared with standard values established in a memory program provided for each one of the valves controlling the printers block of each one of the printing bodies. A reading is taken decomposed into three variables, each one of which corresponds to one of the three basic colors of the visible spectrum in which the light from the colored stain is diffracted by means of a ROWLAND diffraction grating in which there is reflected the light from optical fibers arranged at 45° angles with respect to the printing paper, and which direct a beam of light on the colored stain. At the point of convergence of each one of the diffracted colors, there is arranged a photo pickup device whose signal is amplified by a logarithmic amplifier and connnected to a digital signal which is sent to a microprocessor for processing.

1 Claim, 3 Drawing Sheets

MEASURING ELEMENTS OF CLOSED CIRCUIT SYSTEMS FOR CONTROLLING-CORRECTING THE PRINT IN OFFSET PRINTING MACHINES

BACKGROUND OF THE INVENTION

The invention relates to improvements in the measuring elements of a closed circuit system for controlling and correcting the print in an offset printing machine, using densitometric measurements of each of the colors employed in the offset technique, with a single measurement for each color registration, whereby the component of the basic colors of each of the colors taking part in the printing is evaluated by decomposing each of the colors into red, green and blue. The evaluation is carried out simultaneously to obtain three values which are continuously compared with other values established in a memory program provided for each one of the valves of each one of the printing bodies.

Polychromatic printing by the offset system is determined by the successive addition of crosslinking points which reconstitute an image decomposed into parts comprising blue, yellow, red and black; the perfect positioning of these colors and the proximity of the crosslinking points permit the human eye to perceive a clear image containing the colors and tones of the original subject.

The proportion of each color is established from the start, when the printing molds are prepared, but the amount of color deposited on the paper during printing depends on the amount of ink and there is no rule or mathematic formula which permits the amount of ink that the printed image should bear in each one of the colors to be established.

The chromatic equilibrium in each case depends on the evaluative criterion of an expert who, after carrying out sufficient tests, determines the appropriate rule for the specific case in question.

Once the appropriate rule for that type of printing is established, a continuity should be maintained, wherefore the ink adjusting elements should be revised periodically. This verification in the quality and equilibrium of the ink also takes place subjectively, depending on the criterion of the expert and is carried out by sampling.

In practice, the temperature of the ink, when commencing printing, is determined by the room temperature of the premises. After a working time of approximately 1 hour, the friction and lamination undergone by the ink causes the temperature to be increased in about 5° C., whereby the viscosity is dangerously reduced for the equilibrium of the colors. Thus, for example, an ink which at 22° C. has a viscosity of 550 poises, will at 27° C. have a viscosity of 375 poises, wherefore there is produced an increase in the output of the ink at the same velocity at which the temperature is increased, but not in proportion thereto.

These variations, presently uncontrollable, are practically impossible to detect, since the difference only appears if printed sheet 1 is compared with printed sheet 5,000, for example. Hence a continuous sampling takes place while printing.

Nevertheless, the printing speed of from 4 to 6,000 sheets/hour with plane offset and from 20 to 25,000 sheets with rotary offset, forces a constant action to be maintained on the installation.

On the other hand, to fairly evaluate the problem existing with respect to this question, it is necessary to bear in mind that the ink, in the system of partial discharge from the printers block, is controlled by an alignment of valves constituted by cutters of about 4 cms in length which attack the vibrator roller, leaving a narrow slit whose separation determines the amount of ink deposited during printing.

In a printing machine having a mold bearing cylinder which has a perimeter of 100 cms and a length of 140½ cms, there are arranged 36 cutters of the valves which permit a greater or lesser amount of flow of ink in a particular zone. For example, if there is a strip of the paper which should not be printed, it is necessary to close the printers block in the zone corresponding to that strip.

Thus, it is clear that it is not only necessary to control and modify the amount of ink in order to maintain a chromatic equilibrium, but it is also necessary to know to know at which specific zone of the printers block the correction should be made. For such an effect, the valves are identified in correspondence with identification zones provided on the printed papers, so that if an excess or a lack of color is observed at a particular spot on the printed sheet, the valve of the printers block which should be opened or closed to correct this error can become known.

Bearing in mind that the addition of further ink modifies the characteristics of that which remains in the printers block, it can clearly be seen that the printing machine should be serviced with respect to the control of the print.

Hence, it is not surprising that this industry, urged by the interest of the printers, attempts to find and put into practice means capable of automatically fixing, firstly, the parameters between which the quality of the print should be maintained, and subsequently maintaining such parameters throughout the run, without any human intervention.

The publication DER POLYGRAPH has occasionally dealt with this subject giving rather theoretical general information of possible solutions adopted concerning this question. In an article referring to the IN-KATRON system, it indicates the provision of a fixed scanner head which is provided with an obturator synchronized with the operating speed of the machine by means of an electric chronometer mechanically joined to the printing cylinder. The scanner head takes three values: one of the white value of the paper; a second of the density of the color of the ink, and a third of the black value. Subsequently, the white value with respect to the density of the color is compared in a computer with the white value with respect to the black value, these values resulting in a voltage which is proportional to the density of the color independently, in theory, of the illuminating power or the sensitivity of the photoelectric cell.

However, this principle has not been feasible in practice and no installation is known in which it has been applied, not even partially, since the use of a fixed scanner head and a mechanical obturator synchronized with the operating speed of the machine only permit a narrow strip of paper to be measured. This can never give a clear idea of the complete print which, as is known, depends on the control of 36 zones of the printers block.

Another article, also publisehd in DER POLYGRAPH, this time referring to the GRETAG-T 61 installation, discloses a measuring system based on a densitometer, whereby each of the colors of the scale and three tones of black is measured, i.e. three measurements per color, and density values are obtained by means of the light reflected by the strip of paper which is converged by an optical scanner which, provided with a filter, feeds a semiconductor photoreceiver which generates an electric current proportional to the amount of light. The needs of the printer are not satisfied by this measuring system, since a total of 12 successive measurements should be taken, inserting a filter in each case, which requires a complicated mechanics, wherefore the assembly is prone to failures and, therefore, hardly reliable.

To eliminate the unreliability of the preceding system, other means have been searched for, such as that disclosed in German patent No. 2,238,007 wherein a scanner head formed of three phototransistors, in front of each one of which there is arranged an optical filter having a narrow strip, whose by-pass zones differ from each other. Thus, the print is directly scanned, wherefore different measurements should be taken, preferably outside the machine, adopting again the sampling system and avoiding the principle of continuous control of the print with the slowness inherent thereto and the inclusion of the error contained therein.

This avoidance is clear when the invention is compared with the object of German patent No. 2,203,145 according to which one or more, but not all, of the columns of the printing product are scanned, in other words, some of the 35 columns into which, in practice, the inking roller is divided by the control valves of the printers blocks.

Differing from other patents to which reference is now made, measuring takes place by reflection and transparency, complicating it even more, if possible, to finally obtain confused values since the transparency, for example, is very variable on the same printed sheet mainly due to the paper itself.

These German patents avoid the commonly used practical means for measuring, the densitometer, and instead employ other means. However, although German patent No. 2,238,007 considers the densitometer as an element pertaining to the prior art and can, therefore, be replaced by other more modern techniques, the use of filters are maintained and three measurements are taken, one for each color. Thus, the prior art is hardly improved and the invention does not represent a major advance which, on the other hand, is dubious.

U.S. Pat. No. 2,968,988 describes an apparatus for detecing the density of the ink which comprises a photoelectric scanner head which is transversally movable to the print, wherein the reading is taken on colored stains.

The stains are scanned by the photoelectric head after the sheet of paper has passed along the printing cylinder, thereby detecting the value of the reflection density of a given tone and showing them to the operator so that he may, depending on his criterion, apply the values of the ink and correct the tone of the print.

The values which the operator detects are marked by a recording galvanometer which prints, on a strip of paper, zones for the different colors, each zone including the repeating configuration which represents the variation in the density of the ink for the color in question on the width of the sheet.

Subsequently, the same inventor improved the apparatus in U.S. Pat. No. 2,969,016, including filters using a single photoelectric cell which is enclosed in a rotary obturator, one part of its circumference being provided with an opening situated in such a way that the light reflected from the colored stains can pass successively through the opening and can strike against the photoelectric cell. The obturator rotates synchronously with the printing cylinders which, logically, complicates the system.

On the other hand, in accordance with the invention, the photoelectric cell is furthermore exposed to two illumination intensities having a different standardization and the rotary obturator encloses the photoelectric cell during a part of each rotation, emitting a prior control signal followed by a measuring signal which is registered by indication instruments as in the prior invention.

Both cases do not detect what part of the printers block sends a greater or a lesser amount of ink than necessary and, therefore, utilization of the invention is doubtful, so much so that it has not, in practice, been applied to any offset printing machine.

Another attempt to solve the problem appears in U.S. Pat. No. 3,736,725, wherein, returning to the densitometer as the measuring element, complementary filters are used by means of which the colors are measured independently, using an illumination from a discharge lamp similar to a stroboscope which is synchronized with the advance.

However, the measurements which are obtained do not indicate in which part of the printers block an excess or a lack of ink is being produced in each one of the colors.

Other patents, such as U.S. Pat. No. 3,970,394, describe this problem trying to solve same with even more sophisticated systems. In the case of this patent, the problem is solved by using optical fibers and reflection filters, the optical fibers acting as detectors.

The importance of this subject is clear from the aforegoing data since, different persons in different countries have dedicated their time in finding a solution thereto. There is no doubt that a thorough search of prior art would bring to light a high number of patents wherein other persons in other places have also sought solutions. However, since the correct solution to this problem is a general concern of printers and manufacturers of machines for graphic arts, it is known that the solution, if it exists, would have been published by specialized informants (DER POLYGRAPH, for example) and the installations would have been exhibited in International Fairs. Thus, one can summarize the prior art as being the following:

Use of a densitometer as the measuring element.
Use of photosensitive cells as the measuring element.
Use of complementary narrow band filters, etc., for selecting the measurement.
Use of synchronous means to effect measuring in a machine during the printing process.
Use of different measurements for each color.
Measuring zones of the print.
Measuring the complete print.
Measuring colored stains.
Measuring with a fixed measuring head.
Measuring with a movable measuring head.
Measuring data plotted graphically on a strip of paper.

Since the real needs are to know the degree of distortion before it is produced in a visually appreciable manner, to automatically effect the correction, storage of data for subsequent issues, etc., it is clear that the prior art does not solve the problem due to the following reasons:

The constant attention of a specialist is required.
The specific valve or valves which should be controlled in each case is not indicated.
The correction should be made manually and then the result should be awaited.

SUMMARY OF THE INVENTION

An object of the invention is to precisely obtain clear, reliable, rapid and sensitive measurements.

Another object of the invention is to provide portion precise data concerning the specific valve or valves to be controlled, magnifying this adjustment.

A further object of the invention is to obtain the informatin of the possible distortion or distortions before same can be visually appreciated, so that throughtout the printing run all the examples will appear to the more experienced human eye as having the same quality.

The means used to evaluate the measured data, the means for correcting which will act automatically to control the valves, the automatic analysis of the results, data to be filed, etc., are those already disclosed in the patent pertaining to the same Spanish application No. 457,779 which was also filed in Germany under No. P.2730421/8.

Thus, the following pages of this specification will more specifically deal with the measuring means and the joining thereof to the processing elements and the control means without specifically describing these.

The detector is comprised, in accordance with the present invention, of a densitometer which receives the light reflected by a colored stain through, or not through, a colimating lens and leads it to a ROWLAND diffraction grating which decomposes the reading into three basic colors of the visible spectrum which are independently and simultaneously collected by three pick up devices which send a signal to three amplifiers from which they are commutated (i.e.—multiplexed), converted and microprocessed so as to be utilized to control the valves of the printers block of each one of the printing bodies.

Differing from the aforegoing, there are as many colored stains as valves with which each one of the printers blocks are provided and, therefore, each reading is perfectly identified with respect to the valve corresponding thereto, wherefore only the adequate valve is corrected.

The ROWLAND diffraction grating is curved and decomposes the light which it receives through, or not through, the collimating lens of the densitometer into three basic colors, red, green and blue. However, this decomposition is not dispersed, but it is concentrated and focussed into three specific points, which are separated from each other where the corresponding pickup devices are located.

This view of the colors, since it is identical to that which the human eye sees, seems to be ideal in practice, since, in short, the eye of the expert will be that which prevails on the information and correction of the machine.

As a means of illuminating the colored stain, two optical fibers are arranged at 45° coinciding with the center of the diffraction grating, thereby forming a perfect beam of light which responds to a homogenous illumination.

The densitometer is moved transversally to the paper, reading the components of the basic colors of each colored stain, the reading being taken when an activator sends an amplified signal to a microprocessor which activates the densitometer; the activator is an optical sensor located in the passage of the line of colored stains so that one of the stains costitutes the activating means thereof.

Thus, the filters, the successive readings to establish the values of the print, the special stroboscopic lights, the reading by sampling, sophisticated synchronizing apparatus, etc., which are unavoidably essential in the prior art have been eliminated.

For a better understanding of the foregoing, a set of drawings is attached hereto, wherein the invention is schematically represented, using blocks in those cases representing complex electronic apparatus which are commonly supplied completely constructed, and which are available in the market to any expert and which, due to the peculiarity thereof, can be used for this purpose as well as others not related to the object of this invention, such as converters and microprocessors.

DESCRIPTION OF THE PREFERRED EMBODIMENT

Figure 1:
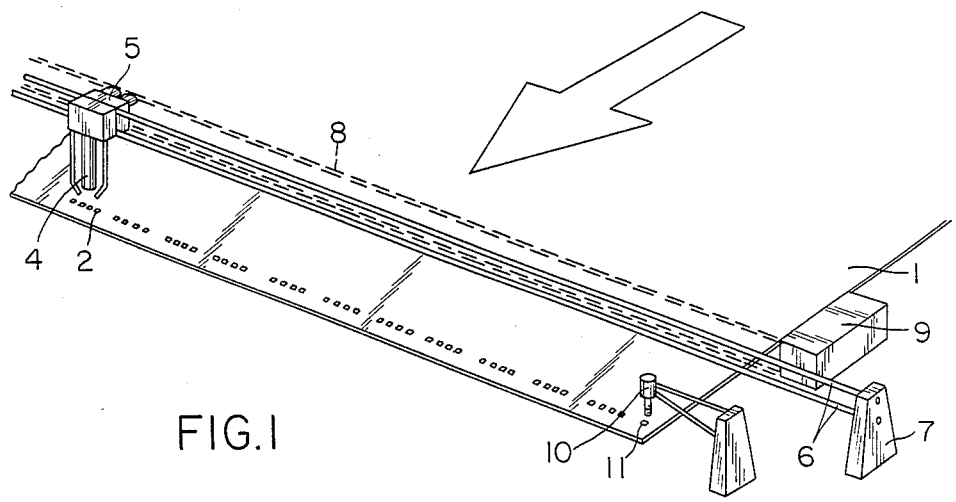
FIG. 1 illustrates a schematic perspective detail representing the printed paper 1 with an arrow indicative of the direction of its movement, the colored stains 2 on which the reading will be carried out, the densitometric assemply 4, the displacement guides 6, the activation detector and the motor which moves the densitometer.
Figure 2:
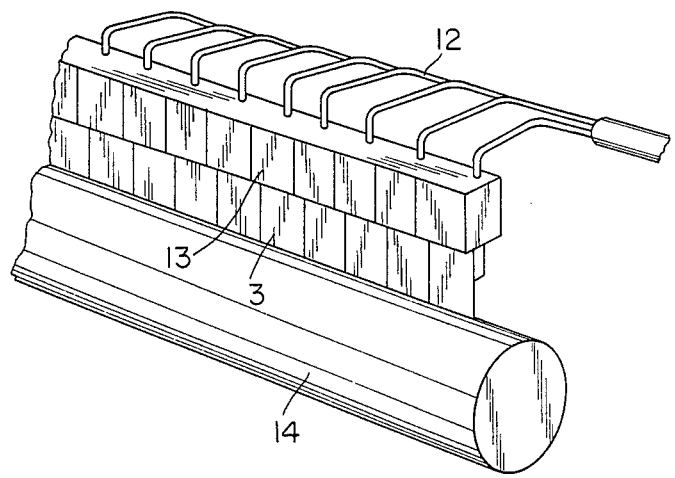
FIG. 2 represents a perspective detail of the roller 14 which extracts the ink from the printers block and the cutter of the valves with the corresponding motors responding to the orders of a microprocessor which evaluates the data taken by the densitometer.

Referring to the drawings, the paper 1, which can be a sheet or a roll, moves in the direction of the arrow and incorporates the colored stains 2 which are grouped according to the number of printing bodies, each group corresponding to one of the valves 3 which controls the flow of ink.

The densitometer 4 is arranged on a carriage 5 which is supported by guides 6 which are transversally arranged in the path of the paper and secured to supports 7 fixed to the fixed structure of the printing machine which is not shown.

A cog belt or a chain 8 is operated by a step-by-step motor 9 and insures the movement of the carriage 5 and therefore, of the densitometer 4, situating it in the path of the adequate colored stain.

A sensor 10 is arranged on the paper in the path of a colored stain 11, and activates the densitometer 4 when it is situated on the colored stain to be measured.

The ink correction order will reach, through the wiring 12, the servomotors 13 which will act on the corresponding cutter of the valve 3, increasing or restricting the flow of ink when the edge of the cutter is neared to or separated from the surface of the roller 14.

The densitometer 4, which is arranged on the colored stain 2, comprises optical fibers 15 and 16 which are placed at 45° with respect to an axis 17, and which direct a ray of light on the colored stain forming, by reflection, a beam of light 18 which, through the collimating lens 19, is directed to the ROWLAND diffraction gratings 20 obtained by holography. The light reflected is diffracted into three converging rays 21, 22 and 23 corresponding, respectively, to red, green and blue which, by means of the photosensitive pick up devices 24, 25 and 26, are transformed into electric signals which are amplified by the logarithmic amplifiers 27, 28 and 29 and fed to an analog multiplexer 30, actually a CD 4067, and then fed to an analog to digital 31 which feeds a commercially available microprocessor 32, actually a Z 80, which is connected to another complementary microprocessor 33 so as to obtain an instantaneous reply.

The microprocessor 32 also receives the signals from the sensor 10 which are processed by an amplifier 34. Likewise, the microprocessor 32, through a step-by-step "DRIVER" circuit 35, is connected to the motor 9 which acts on the chain means 8 so as to displace the carriage 5.

On the other hand, the microprocessor 33 is provided with terminals to which there are connected information, data and dialogue recording peripheral units 36. In addition, the microprocessor 33, by means of corresponding power amplifier stages (not shown), operates the servomotors 13 which act on the valves 3.

Figure 3:
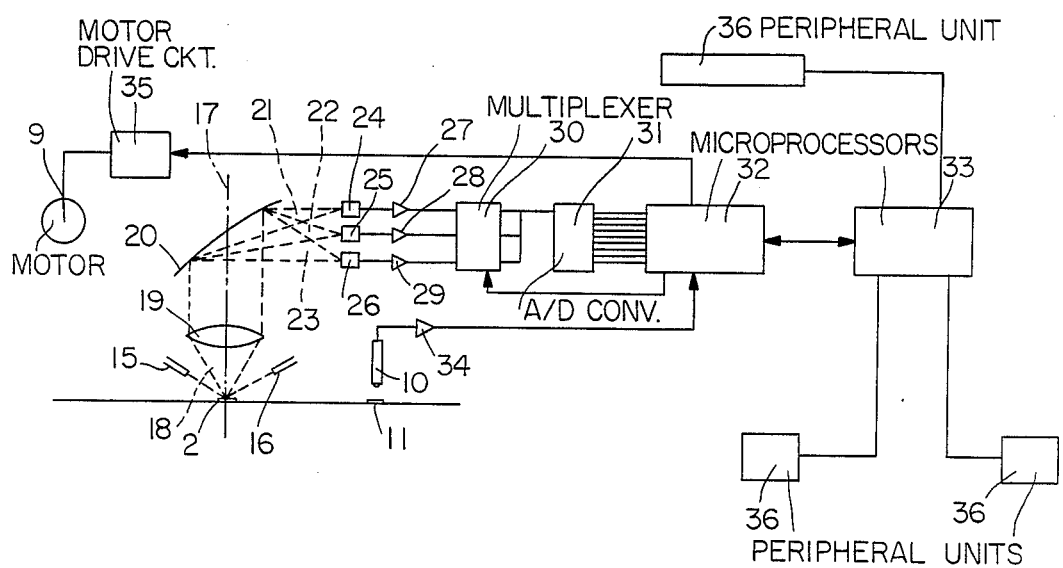
FIGS. 3 and 4 represent schematic block diagrams of the present invention.

Although the invention is exclusively centered in the measuring elements of closed circuit systems for controlling and correcting the print in printing machines and not in the means used to evaluate the measurement, it is important to point out the existence and arrangement of these means in order to establish the joining thereof, and therefore said means have been schematically, but in a clear manner for an expert, been represented and reference in FIG. 3 of the drawings.

When a printing machine has been prepared to initiate the printing of a run, the printers blocks, through one of the peripheral units 36, are set at a zero position wherein the valves are equally closed or open. When printing starts, the setting of these valves is adjusted until a suitable quality is obtained, which is that which is to be maintained in the opinion of the responsible person. At this moment, the values measured by the densitometer as well as the positions of each one of the valves are introduced in the memory of the microprocessor.

During printing, the densitometer initiates its readings which are simultaneously decomposed to the visible spectrum, prportioning the output of the photo pickup devices with values which, once commutated and converted into digital values, pass to the first microprocessor, and which in turn pass to the second microprocessor which controls the valves.

Any color distortion is noticed by the second microprocessor before reaching the threshold of human perception which consequently operates the servomotors which control the valves, effecting the corrections before a color distortion which is detectable by the human eye, is produced in the print.

The carriage which conveys the densitometer is moved step-by-step transversally to the strip or sheet of paper and since the colored stain passes constantly, the coincidence and, therefore, the measurement always takes place. The motor, due to the microprocessor, counts the edge to edge passes of the paper and then returns with the return steps being adjusted by the microprocessor, so that a continuous reading is produced by the densitometer throughout the print, the reading being cyclic with respect to the colored stains and establishing an automatic closed controlling and correcting circuit, the final results of which can also be stored by one of the peripheral units so as to be used later under identical paper and ink conditions for future reprints and also to obtain graphs of the eveness of the print.

Figure 4:
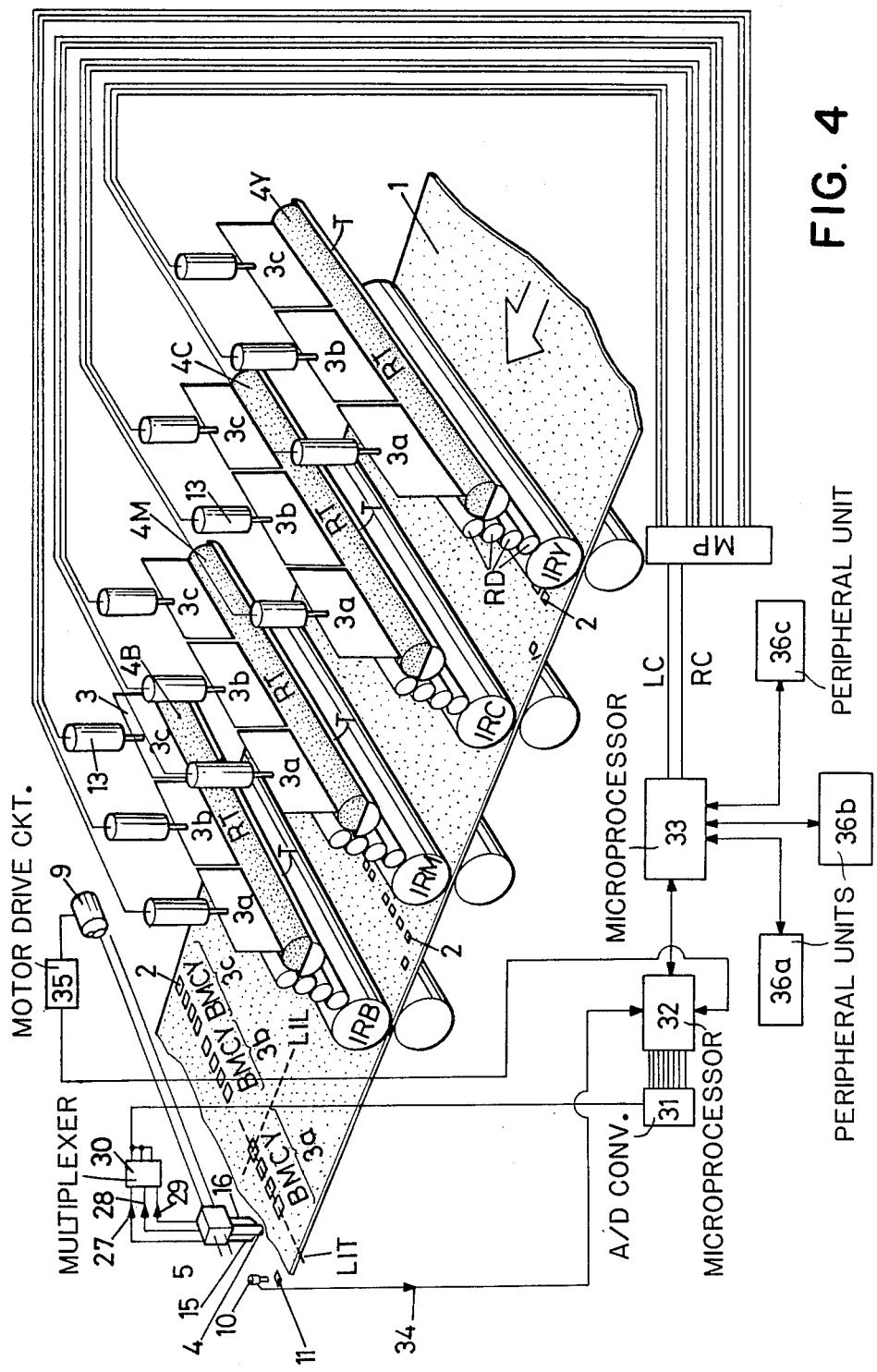

FIG. 4 represents a simplified scheme of the entire printing machine to which the invention has been applied. This machine prints with four colors and is controlled by three gate valves.

The paper 1 moves in the direction indicated by the arrow and passes below the action of the printing rollers IR, the roller IRY prints, for example, the yellow, the roller IRC prints cyan, the IRM magnenta and the IRB black. This takes place according to normal OFFSET printing techniques.

These rollers IR incorporate the printing mould but also print each one of these three color stains 2 which correspond to a stain for each valve 3, these stains form a line as illustrated in the drawing.

The stain is respected in each turn made by each roller, wherefore transversal lines of stains 2 appear on the paper. For reasons of space, the drawing is not in proportion. It should also be pointed out that, in fact, each roller IR is served by 36 valves and not three as illustrated in the drawing, that is to say, that in fact there are as many color stains 2 of each color as valves 3.

The stains on the paper form a line but they are grouped, the accordance with the drawing, in three gropus 3a, 3b, 3c which correspond to each valve 3a, 3b, 3c of each of the rollers IRC.

As shown in the drawing, each roller IRC receives ink from the rollers supplying the RD ink. These rollers RD transmit the ink from the roller of RT ink which take it from the printers block T which is full of ink of the corresponding color.

The roller RT turns inside the printers block T and hauls ink whose thickness is adjusted by the valves 3. As illustrated in the drawings in valves 3 (3a, 3b, 3c), are cutters which, depending on the nearness of the RD which cover it to deliver it so the printing roller IR and this, in turn, passes it to the paper printing the image, text, etc., to be received by the printed sheet, thereon. However, it should be recalled that it prints the color stains 2.

Now, as the printing paper moves, the color stains are read to verify that the amount of color on each stain is correct to compose an almost correct image. If it has too little color, more ink should be given. If it bears too much color, ink should be removed.

However, it should be known where more or less ink is needed since one part of the print can be correct and the other incorrect. Therefore, it should be known which is the valve 3 of the roller RT to be corrected so that the correction takes place at the correct zone.

The densitometer 4 is mounted on a carriage 5 which moves along guides 6 activated by a motor 9 acting on the chain or on a drum, and not represented to avoid undue complication of the drawing.

The constitution of the densitometer 4, with the optical fibers 15 and 16 arranged at 45° with respect to the optical axis, is detailed about in FIG. 3.

The reading detector, also known as the header, formed by the assembly 4-5-15 and 16, moves while reading the stains 2. Displacement is step by step and each step is equal to the separation between the centers of the stains 2. The gaps between each group of stains 3a, 3b and 3c correspond to multiple distances, so that with continuous movements, the detector or header is located on one stain or the other.

To be able to carry out reading of a color stain, only one problem should be solved: the exact positioning of the header 4 on the vertical of the center of the stain.

It has already been mentioned that transversally to each advance step of the motor there is a coincidence with a stain, but this coincidence is with a longitudinal imaginary line LIL with respect to the paper 1 which passes along the center of a stain 2.

It is now necessary to also position the header 4 on a transversal imaginary line LIT which passes through the center of all the stains.

At this precise moment reading takes place at the center or crossing of the two imaginary lines LIL and LIT.

This is carried out by the stain 11, known as synchronism in combination with the sensor 10 comprised of a photo pickup device.

When the sensor 10 detects the stain 11, a signal is produced which, through the amplifier 34, passes to the microprocessor 32 which activates the header 4 and receives its reading.

In this respect, it should be recalled that the densitometer constituting the header 4 takes a reading, through the ROWLAND diffraction grating which decomposes the light into three converging beams 22-22-23, as shown in FIG. 3 of the drawings. These beams are picked up by the pickup devices 24-25 and 26 which generate a signal which is amplified by the logarithmic amplifiers 27-28-29 to send them, once amplified, to the analog multiplexer 30 and therrfrom to the analog to digital converter 31 which feeds same to the microprocessor 32 and which evaluates the information and sends it to the complementary microprocessor 33 which values whether the measurement is correct or not and solves the operation.

Let us assume that the header of the densitometer 4 is located on the stain C of the group 3B. When the reading takes place, since the sensor 10 has detected the stain 11 and has sent a signal to the microprocessor 32 which activates the header 4, the optical fibers are illuminating the color stain 2 referenced C in the group 3b according to the accompanying drawing.

The amplified, converted to digital reading signal passes to the microprocessor 32 which receives it, processes it and sends it to the microprocessor 33 which evaluates it and decides that it is incorrect.

At this moment the microprocessor 33 knows that the stain C corresponds to the ink roller RT and specifically to the valve 3b of the metnioned roller RT.

The signal to correct passes through the multiplexor to a valve-controlled motor 13.

The signal reaches the microprocessor through one of the two channels LC-RC, the channel LC indicates turn to the left (opening more ink) and the channel RC indicates turn to the right (closing ink). The value of this turn, that is how much should be opend or closed, is decided by the microprocessor 33 which stores in a memory certain ideal values.

The ideal values, pertaining to an ideal printing, are introducted in a memory through a keyboard 36a having a magnetic tape 36b or through any other systems for introducing data.

The ideal printing is established by an expert from printing proofs. The data (incidences of the print) can be recorded on a tape, seen on a screen, etc. within the scope of the available technology.

What is claimed is:

1. In a closed circuit system for controlling and correcting prints produced by an offset printing machine, wherein measured print parameters are first amplified, and then analogically commutated, and converted from an analog form to a digital form, and then microprocessed so as to be compared with standard parameter values which have been previously stored in a memory program, said stored values being provided for each one of a plurality of valves controlling a printers block associated with each one of a plurality of printing bodies, the improvement comprising a means for measuring light reflected directly from a colored stain located on a print, only once for said stain, and then decomposing said measured light into three variables, each one of which corresponds to one of the three basic colors of the visible spectrum in which said light reflected from said colored stain is diffracted by means of a ROWLAND diffraction grating, wherein said reflected light is emitted by optical fibers which are arranged at an angle of 45° with respect to a line normal to said print, and which direct a beam of light on the colored stain, and wherein at the point of convergence of each one of the diffracted colors, there is arranged a photo pickup means connected to a logarithmic amplifier which generates said amplified signal which is subsequently fed to a microprocessor means after being commutated and converted, wherein a photosensitive sensor is also provided so as to determine when said means for measuring is to be operated.

* * * * *